UNITED STATES PATENT OFFICE.

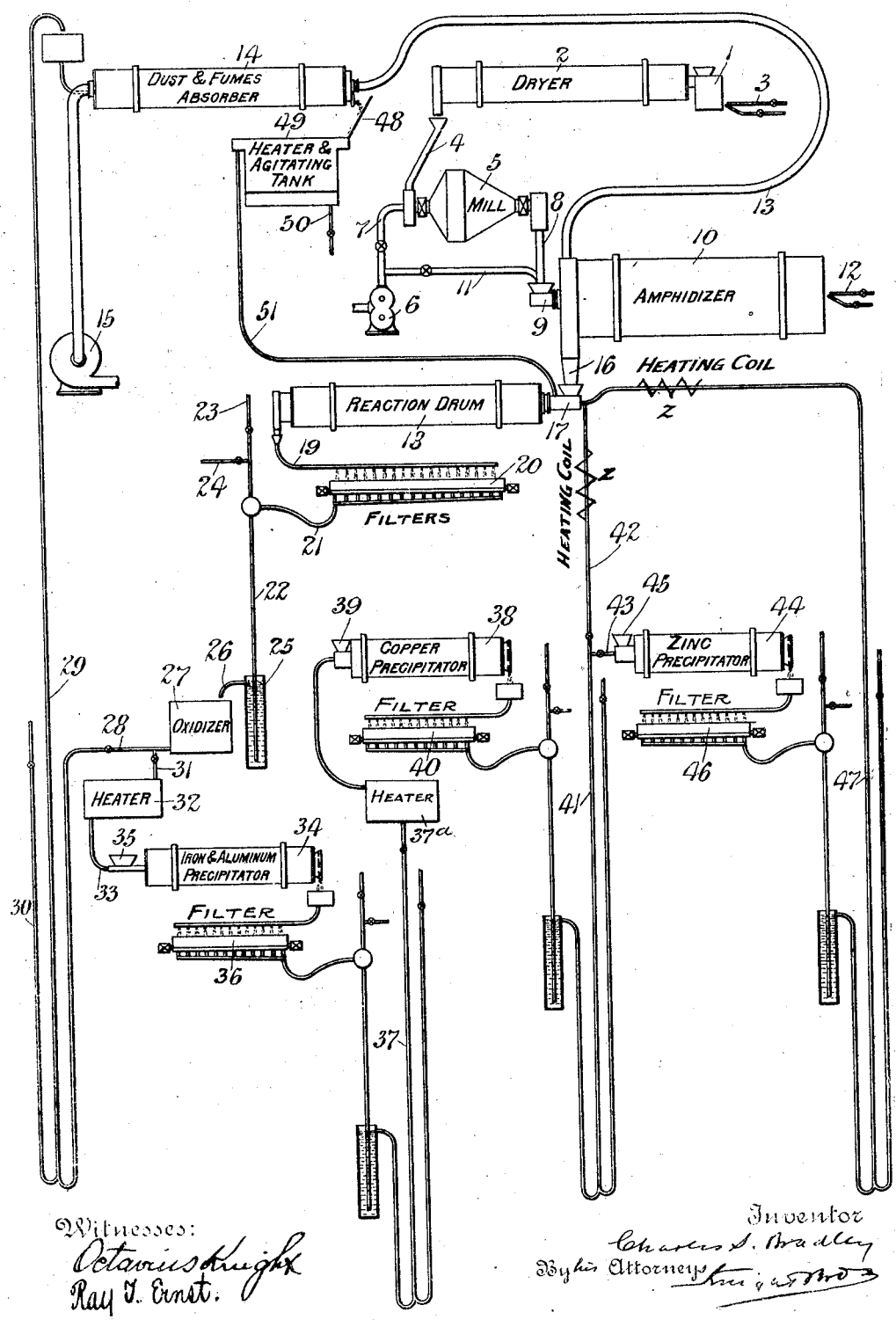

CHARLES S. BRADLEY, OF NEW YORK, N. Y., ASSIGNOR TO BRADLEY COPPER PROCESS COMPANY, OF JERSEY CITY, NEW JERSEY, A CORPORATION OF NEW JERSEY.

METHOD OF TREATING COPPER-BEARING SUBSTANCES.

1,011,562. Specification of Letters Patent. Patented Dec. 12, 1911.

Application filed June 23, 1910. Serial No. 568,461.

*To all whom it may concern:*

Be it known that I, CHARLES S. BRADLEY, a citizen of the United States, and a resident of the borough of Manhattan, city, county, and State of New York, have invented certain new and useful Improvements in Methods of Treating Copper-Bearing Substances, of which the following is a specification.

My invention relates to the chemical treatment of copper bearing substances to concentrate their values and is particularly adapted to the treatment of low grade cupriferous bodies or ores.

Many copper bearing ores contain mixed copper compounds, such as oxids, carbonates, sulfids and the like and metallic copper. In most cases, and particularly in low grade ore, the values are associated with relatively great masses of gangue, so that they can not economically be treated directly for the recovery of metal. In order to eliminate, so far as practicable, the gangue, various concentrating methods, mechanical and otherwise have been proposed. By mechanical methods fair degrees of concentration are obtained with some ores which are adapted to such methods, but even with these there still remain considerable quantities of gangue which can not be eliminated mechanically. At the same time in many cases the loss of values in the tailings amounts to about one third of the entire content. In fact in very few cases does the recovery by mechanical concentration exceed 70%, so that for every two tons of copper recovered, it is not unusual that one ton is lost. To obtain a more perfect concentration and avoid so far as possible this enormous waste of values, numerous attempts at wet or chemical methods of concentration have been made, but these, for various reasons, have met with little or no commercial success so that the mechanical method of concentration is practically the only one found in commercial use today. Some ores, moreover, although containing copper and other values which it would be profitable to concentrate or extract are not adapted to mechanical methods, and for this reason have little or no commercial value.

The object of my invention is to provide for a higher degree of concentration with less loss than can be obtained by mechanical concentration, and at less cost, and also to concentrate or recover the values from those ores which, from their character, are not suited or profitable to treat by mechanical or other methods in practical use.

It is well known that each of the values contained in the ore can be brought into solution by some chemical agent but there are few if any chemical agents which will bring them all in at one operation. In many cases, furthermore, considerable difficulty is met with in filtering, settling, or otherwise separating the solution from the gangue and suspended particles and also in recovering the values from the carrier.

My invention provides an economical chemical method of concentrating the values, and comprises broadly the use of a chlorin compound as a carrier and transformer, by which waste products are made insoluble and the values taken into solution and removed from the gangue and non metallic constituents of the ore or other material treated, and from which solution the values may afterward be recovered.

The concentration or extraction of the values as chlorids presents many advantages, among which may be mentioned the rapidity and completeness of solution, and the facility of filtration, separation from the slimes and gangue and precipitation or recovery of the metal. But the provision of a suitable chlorin carrier presents a number of problems which I have succeeded in solving by the present invention. I employ for this purpose a chlorin carrier which will yield up its chlorin to the values to form soluble chlorid compounds therewith, and at the same time form insoluble compounds with the substances with which the values are combined, such as the sulfur or acid constituents. I have found that calcium chlorid possesses the desired and other favorable requisites as a chlorin carrier, among the latter being that it is inexpensive, and readily and easily obtained or manufactured in the vicinity of the work and that it is easily revivified or regenerated for continuous use in the process.

In order that the chlorin compound shall become effective in dissolving the values, the presence of an acid radical is required. This may be secured by the direct addition of a suitable acid or its salt, such for instance as sulfuric acid; which not only renders the chlorin compound effective to dissolve the values but also forms an insoluble precipitate of the intermediary substances, viz. calcium and sulfuric acid, in the form of calcium sulfate. Instead, however, of directly adding the acid it is preferable for economy to use for this purpose as far as possible the materials found associated with the copper ores as the places where these ores are found are generally remote from sources of chemical supplies. Most copper ores contain considerable sulfur as sulfids of copper and iron, and theoretically for the solution of each 2% of copper we require 1% of sulfur to form sulfate of copper. My invention therefore aims to effect oxidation of the copper, iron and sulfur, and preferably at such a temperature that the copper shall be left as a sulfate while the iron is left as an oxid, thus introducing the necessary acid radical, and any excess sulfur and oxids shall pass to subsequent steps of the process to be used for further acidification of the copper compounds, and also for absorption to prevent contaminating the environment. Excess sulfuric acid with the iron oxids or hydro-oxids or soluble silica produces compounds which seriously interfere with the separation of the gangue from the solutions either by settling or filtering. I have found, however, that by replacing the sulfur compounds by chlorin compounds, under the conditions of operation employed according to my invention, filtration or other separation of liquids from solids is accomplished with great rapidity and completeness.

To operate my process it is only necessary to bring in a small quantity of calcium chlorid to initiate the process and make up the wastes as the chlorin is retained in solution, and the calcium chlorid regenerated when the values are precipitated, as will be shown further on.

One of the principles employed in accordance with my invention is to convert the values into copper chlorid which is soluble in calcum chlorid solution and to precipitate the values (in the form of copper oxid) by the addition of calcium carbonate. Probably the simplest embodiment of this principle is found in the formation of cupric chlorid from copper sulfate which is produced in a preliminary amphidizing or roasting step, and the subsequent precipitation of the copper content by calcium carbonate. Considering the copper sulfate alone it will be observed that in contact with calcium chlorid this salt forms directly cupric chlorid and calcium sulfate $$CuSO_4 + CaCl_2 = CuCl_2 + CaSO_4.$$

Here it will be observed that the copper content is in soluble form whereas the calcium sulfate which does not contain any values is insoluble, and hence precipitates. In other words, the calcium chlorid solution takes up only the values as distinguished for example from a sodium chlorid solution which in the reaction referred to would produce sodium sulfate which, being soluble, would remain in the carrier. The complications arising from the presence of substances other than the values in the carrier are thus to this extent eliminated. The calcium chlorid has another important advantage in the subsequent operations. The solution loses calcium which goes into the formation of the calcium sulfate as above indicated. The chlorin, however, is conserved in the copper chlorid. The regeneration of the carrier and the precipitation of the values in a highly concentrated form may thus be accomplished in a simple and rapid reaction by introducing calcium carbonate which is a plentiful and hence inexpensive substance. Omitting the water of hydration for the sake of simplicity here as elsewhere, the reaction in this instance takes place between the cupric chlorids and the calcium carbonate as follows:

$$CuCl_2 + CaCO_3 = CuO + CaCl_2 + CO_2.$$

Here it will be seen that the values are in the form of copper oxid, assuming that the temperature is high enough to drive off the $CO_2$, and as this substance has a copper content of about 80% the high degree of concentration will be apparent. It will also be seen that calcium chlorid is regenerated.

Aside from the more apparent advantages which the use of calcium chlorid has been shown to possess, it is found that the difficulty which is usually met with in filtering, settling or otherwise separating the solids from the liquids in operations of this kind due to clogging is largely done away with as by maintaining the calcium chlorid in the liquid the clogging is prevented and the flow of the liquid through the separating medium facilitated.

With this understanding of the general principles involved in my invention, it will now be seen that the method provides for the conversion of practically all of the copper values contained in the ore into copper chlorids. For an understanding of the various reactions a more complete description of the details is necessary.

In the preferred form of my invention the first step is to subject the crushed and finely ground ore to a prelimiary amphidizing by which is meant, in this instance, the direct forming of a sulfate by the absorption of oxygen by a sulfid. This step involves heating the crushed ore to a temperature of from 450° to 550° C. with access of air, by which oxidation occurs. Of course the specific reactions which take place will vary with the character of the ore, and the management of the amphidizing apparatus, but theoretically all the copper existing as sulfid is converted to sulfate as described and most of the iron usually present in the ores is converted into ferric oxid, which being insoluble does not go into the solution but remains in the gangue. In practice, however, some of the iron is converted to and remains as ferric sulfate, a small portion of the copper remains as the sulfid, another small portion becomes oxidized to copper oxid and in some cases the ore may contain metallic copper which may escape oxidation. Dust and fumes containing sulfurous and sulfuric anhydrids are also produced. These compounds and the dust and fumes serve a useful purpose in the process, as will be shown, so that the amphidizing or roasting treatment need not be always complete, and variations in the operation of this apparatus will not affect final results. This is a feature of great advantage as it relieves the amphidizing apparatus from the necessity of a strict and constant supervision. The mass of amphidized or roasted ore is brought into association with an excess of the calcium chlorid solution preferably at a little below boiling temperature in a reaction drum. As above explained cupric chlorid is produced by the reaction between the copper sulfate and calcium chlorid. The ferric sulfate remaining in the mass coming from the amphidizer reacts with the calcium chlorid to produce ferric chlorid which dissolves and calcium sulfate which is insoluble. This ferric chlorid performs the useful function of dissolving the copper oxid remnant as well as the copper of the copper sulfid and metallic copper remnants, converting the same into copper chlorid. If the ferric chlorid is insufficient in quantity to dissolve all these remnants the balance is dissolved by the cupric chlorid or the free acid formed by the action of the calcium chlorid on the amphidized ore as will be more fully pointed out below.

Owing to the completeness of the reaction in the amphidizer, a comparatively small amount of sulfur remains in gaseous form. This goes out in the form of sulfurous and sulfuric anhydrids in proportions varying, in instances so far tested, from 2–1 to 3–1. The reaction with the $SO_2$ is more fully described hereafter in connection with the full description of the process.

Sulfuric acid mainly from the $SO_3$ in the dust and fumes led from the amphidizer to the solutions produces hydrochloric acid with the calcium chlorid which may react with any cupric oxid present to form directly further quantities of copper chlorids:

$$H_2SO_4 + CaCl_2 = CaSO_4 + 2HCl$$
$$CuO + 2HCl = CuCl_2 + H_2O.$$

The cupric chlorid is soluble with the calcium chlorid, whereas the calcium sulfate precipitates as before. The cupric chlorid produced from these various sources has an important function aside from its being soluble in the calcium chlorid solution. This substance provides for the recovery of any free copper and unamphidized copper sulfid remnants not taken care of by the ferric chlorid as above referred to. With these substances it produces cuprous chlorid.

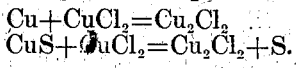
$$Cu + CuCl_2 = Cu_2Cl_2$$
$$CuS + CuCl_2 = Cu_2Cl_2 + S.$$

The sulfur in the last reaction precipitates so that here again it will be seen that the waste product is not taken up by the carrier. It is necessary that sufficient cupric chlorid shall be present to insure that there will not be any remnant of copper values undissolved and preferably it should be in excess. To this end the cuprous chlorid is converted to the cupric condition by supplying air at a suitable part or parts of the apparatus so that the cuprous chlorids are oxidized, as follows:

$$Cu_2Cl_2 + O = Cu_2Cl_2O.$$

This salt upon contact with some of the hydrochloric acid produced by the sulfuric acid with the calcium chlorid is converted into cupric chlorid which is taken up by the carrier, the by-product being water.

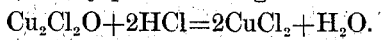
$$Cu_2Cl_2O + 2HCl = 2CuCl_2 + H_2O.$$

Any cuprous oxid remnant in the reaction drum forms cuprous chlorid with some of the hydrochloric acid

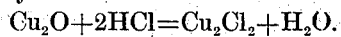
$$Cu_2O + 2HCl = Cu_2Cl_2 + H_2O.$$

The oxidation of this and reaction with further quantities of hydrochloric acid takes place as above indicated.

The presence of insoluble oxychlorids of copper and iron in the solutions, would tend to clog the oxidizer towers if permitted to remain, and therefore the presence of an acid radical in sufficient quantity in the solutions to convert all the oxychlorids into chlorids is necessary.

The copper chlorid is further maintained in the cupric state by the action of the iron chlorids formed from ferric remnants in the reaction drum. These iron chlorids acting on the cuprous chlorids convert them to the cupric state and so regenerate the solution. There will also be small quantities of gold and silver present in the ore which can be brought into solution by making all the copper into cupric chlorid and all the soluble iron into ferric salts, and then adding a small amount of chlorin, chlorous or chloric compounds. The chlorids of silver and gold being soluble in calcium chlorid solutions, may be precipitated with the copper or separately.

From the foregoing description of the formation of the solutions it will be seen that calcium chlorid acts as an initial or primary dissolving medium, taking into solution certain of the values, and these values are converted by the calcium chlorid into a condition in which they may serve as an intermediate or secondary dissolving medium by which the remaining values are taken into solution. It is also evident that the process aims to eventually convert all of the copper into cupric chlorid.

The preserving of the copper chlorid in its cupric condition not only insures that practically all of the values will be taken into solution but has a further important effect in connection with the subsequent precipitation, recovery of the values from the solution and the regeneration of the calcium chlorid, as the cuprous compounds are not precipitated by the calcium carbonate. The fact that the solution formed is itself an active solvent of the values is a feature of great advantage since the excess solvent power insures complete extraction even if the attendant does not pay close attention to the conditions of operation. Accordingly as already noted in connection with the amphidizing step, the solution apparatus likewise does not require the strict attention which might otherwise be necessary and the success of the process is not dependent upon the degree of care exercised by those in charge of the operations, thus not only gaining the desired completeness of extraction but at the same time accomplishing this with low labor cost. Having taken all the values into solution as chlorids in the manner above indicated, the mass of gangue solutions and precipitates is then subjected to filtration whereby the solid matter is eliminated and a clear solution comprising a carrier and the values is obtained. Preferably the solution is subjected to a further oxidation in order to insure that the values will all be combined at their highest valency. The solution is then in condition for treatment for the separation of values therefrom. In this condition the solution may contain iron and aluminum compounds in addition to those of copper. Any arsenic which may have been present in the substances treated will have been separated by the filtration as arsenic is rendered insoluble. In order to separate the copper content from the solution I prefer to employ calcium carbonate inasmuch as this produces a precipitate of cupric oxid and at the same time regenerates calcium chlorid. The carbon dioxid evolved by reaction keeps the mass in slight agitation, thus assisting in the access of the precipitating medium to the substance to be precipitated. Inasmuch as cupric oxid will react with iron and aluminum compounds as soon as it is formed, the iron and aluminum precipitation must be completed before any precipitate of cupric oxid can remain and be recovered. On the other hand, the presence of the iron and aluminum salts, especially the iron, in the solution is desired as they are useful in the absorption of fumes and as already pointed out also play an important part in taking the values into the solution. In view of these considerations I divide the solution containing the values and subject a portion of it to precipitation, the other portion being diverted and utilized in the consumption of fumes as will hereinafter appear. The proportion of the solution which is to be subjected to precipitation for recovery of the values may be determined by the increment of values taken into solution at each cycle or it may be governed by other circumstances within the discretion of the operator. By thus subjecting only a portion of the entire quantity of solutions to precipitation the necessity of precipitating all the iron and aluminum compounds before the increment of copper values can be obtained as cupric oxid and the necessity of filtering this increment from the entire mass of solutions are avoided, while at the same time the increments of iron and aluminum are precipitated and a sufficient quantity of iron compound retained for the absorption of fumes and taking of values into solution.

The precipitation of iron and aluminum compounds may take place separately or at the same time with the precipitation of the copper content. I may employ cupric oxid or hydrate or calcium carbonate as the preliminary precipitating medium for the iron and aluminum. Any small quantities of copper which may be carried down with the iron and aluminum may be recovered by returning the precipitate of iron and aluminum to the amphidizer as the effect of the amphidizer is largely to render the iron and aluminum insoluble while leaving the copper in soluble state. Having rid of iron and aluminum the portion of the solution subjected to precipitation, the copper content may then be precipitated as copper oxid (usually carrying a little chlorin, as set forth and claimed more specifically in another application to be filed by me) by the addition of calcium carbonate thus regenerating the calcium chlorid as already indicated.

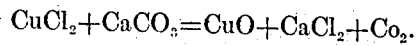
$$CuCl_2 + CaCO_3 = CuO + CaCl_2 + Co_2.$$

The precipitate may then be filtered from the remaining solution and subjected to such further treatment as may be desired for the production of metallic copper or any other desired product thereof.

No matter which of the various methods of precipitation above described may be used it is necessary that the iron and copper salts shall have been carried to their highest valency in order to prevent formation of cuprous salts during precipitation. In the precipitation by calcium carbonate the iron is precipitated as ferric oxid. Therefore, if any of the iron is in a ferrous condition the copper salt will be reduced to an "ous" salt in order that the iron may be precipitated as a ferric oxid. The reactions of iron and copper salts in this process may be quite complicated, the iron may exist as a bivalent salt or a trivalent, the copper may exist as a univalent or bivalent. If an ample supply of oxygen or chlorin be present the copper will be in the bivalent condition and the iron in the trivalent. If the solutions are somewhat depleted of oxygen or chlorin the trivalent iron is first reduced so that the cupric chlorid remains in solution. The cuprous chlorid being much less soluble would be precipitated in case of depletion of oxygen or chlorin, but fortunately the ferrous chlorid has less affinity for chlorin than the cuprous chlorid; therefore in case of depletion we have largely ferrous chlorid and cupric chlorid in solution. It might here be mentioned that the ferrous chlorid is a very soluble salt so that as a whole the iron and copper chlorids when together, remain in a more soluble condition in case of a reduction than copper chlorids would alone.

On precipitation by carbonate of calcium a new condition is introduced, as the iron would be precipitated from the ferrous chlorid as ferric oxid while the copper chlorid is reduced to cuprous chlorid and the copper is not precipitated from the cuprous chlorid by carbonate of calcium while it is precipitated as a cupric hydroxid from cupric chlorid. This demonstrates the necessity of having the salts in the highest state of oxidation or chloridation for the proper and economical precipitation.

I find that from the low solubility of the cuprous chlorid, when it is allowed to exist, in the solutions, on precipitation with calcium carbonate some cuprous chlorid remains in the precipitate thus carrying chlorin away with the product, which makes smelting difficult on account of the volatility of chlorid of copper, and consequently a loss of chlorin from the system as well as loss of metal. Furthermore if any cuprous chlorid remains in the solutions which have been made neutral (any acid having been taken up by the lime of the calcium carbonate) it absorbs oxygen from the air wherever exposed, forming oxychlorid of copper which is insoluble thus clogging pipes, filters, etc. For practical operation the necessity for maintaining these salts in compounds of their highest valency is evident.

The zinc contained in the ores passes into the solution as chlorid of zinc and accumulates. This metal is not precipitated during the precipitation of iron, aluminum and copper above described, and while its presence in the solutions is not harmful in small quantities, it may nevertheless accumulate to such an extent as to make it necessary to eliminate it. For this purpose the solution or a part of it which has had the aluminum and iron and copper removed from it, may be subsequently treated, when desired, with burnt lime for the precipitation of the zinc. Any gold and silver present in the solutions may be carried down during the precipitation of the iron, aluminum and copper and subsequently removed or separated therefrom, in any preferred manner known to those skilled in this art. After filtration, the solutions which have given up the values and taken in the regenerated calcium chlorid are then in condition for taking further quantities of values into solution, and may be returned to go through the cycle of operations which has been described.

Referring again to the initial amphidizing step it should be stated that considerable dust and fumes (either or both of which are hereinafter referred to as the volatile products of the amphidizer) are given off and these contain sulfurous and sulfuric anhydrid. I have found it difficult to approach water boiling temperatures in the drums when any considerable body of gas or air is introduced into them on account of the partial pressures.

When the volatile products are introduced into the drums containing the solution evaporation takes place so rapidly that it is difficult to raise the temperatures to anything like a water boiling heat and as the reaction drum should be as near a boiling temperature as possible, I prefer to take the dust and fumes into a separate drum, where they can be collected at relatively low temperatures in the diverted portion of the solutions still containing the high valency compounds. The solutions may then be taken to the reaction drum where they can be maintained at higher temperature than would be possible if a current of gases or volatile products were allowed to pass therethrough. The sulfuric anhydrid in the presence of water contained in the solutions unites with one of the acid exchanging salts such as calcium chlorid or iron chlorid forming hydrochloric acid and the sulfate of the acid exchanging salt. The sulfurous anhydrid in the presence of water may unite with the cupric chlorid or any remaining ferric chlorid retained in the solution, forming sulfuric acid, cuprous chlorid, ferrous chlorid and hydrochloric acid. The cuprous chlorid, ferrous chlorid and hydrochloric acid thus formed will, upon oxidation, produce cupric chlorid, ferric chlorid and water, and the sulfuric acid in the presence of calcium chlorid will be converted into sulfate of calcium and hydrochloric acid. The dust and fumes referred to may or may not contain sufficient oxygen to complete the oxidation of the substances of variable valency and hence the material coming from the dust and fumes absorbing apparatus is preferably subjected to further oxidation to insure that any deficiency will be made up. The mass may then be introduced into the solution apparatus and thus utilized with the solution containing the regenerated calcium chlorid for taking into solution a further quantity of values in a cyclic manner.

While I have mentioned the formation of hydrochloric acid above it may be noted that the solutions generally contain no free acid and this may be explained by the absorption of the acid by any ferric hydrate or aluminum hydrate formed from the reactions and especially from the oxidation of the ferrous chlorid.

In order to be able to treat large quantities of ore or other copper bearing substances in the shortest possible time and with the greatest economy, the method should be carried on in a continuous manner. An apparatus suitable for this purpose is indicated in the accompanying drawing. It will be noted from the description thereof that by this apparatus the copper bearing substance is continuously received or taken into the apparatus and subjected in a continuous and cyclic manner to the various steps of the process. Stationary tanks and decanting tanks are particularly avoided as necessarily intermittent in operation and limited in capacity, and incapable of economical separation of gangue from liquids carrying the values. The capacity of the minor parts is such that any temporary interruption in the operation of one of these elements does not disturb the continuity of operations, inasmuch as the other steps may still continue. The filtering step involves the formation of cake which must be removed either continuously or at intervals, but whether this removal of the cake from the filters be continuous or intermittent the process as a whole is nevertheless continuous, inasmuch as the capacity of the apparatus permits the other operations to continue during the interval of time required for the removal of the cake should this be done intermittently, and at all other times the filtering is continuous with the other steps, so that even with the intermittent removal of the filter cake the process may still be said to be continuous. Of course in practice a plurality of filters are used, and the cake removed from them successively.

In the drawing the general arrangement of apparatus suitable for the treatment of ore or other copper bearing substance is indicated in diagram.

1 indicates a hopper communicating with a drier cylinder 2 and supplied with heat from suitable means such as a burner 3 which causes a blast of heated air and gases through the cylinder 2. Crushed ore may be fed to the hopper 1 in continuous manner by suitable means, and the dried product continuously discharged from the cylinder into a chute 4 which leads to a mill 5 of suitable construction, in which the crushed ore is continuously ground to suitable fineness. One type of mill which I have found suitable for this purpose is the Hardinge conical mill.

Where plastic slimes are to be treated the drying apparatus illustrated may be employed in the manner set forth in my prior application filed on April 1st, 1910, Ser. No. 552,846, entitled Method and apparatus for drying slimes. The principle involved in that method and apparatus is to return a portion of the dry slimes in a cyclic manner and mix them with plastic slimes, so that a mixture containing a sufficiently low percentage of moisture to permit the mass to be disintegrated is obtained, and thus the slimes are rendered better suited for exposure within the drier cylinder 2 for the extraction of moisture.

A blower 6 may operate through pipe 7 to force air and the ground mass through the mill and discharge chute 8 into the receiving end 9 of the amphidizer 10, or the blower 6 may operate through the pipe 11, pipe 7 being closed, to force air and the ground mass, which is fed by the mill, through chute 8, through the feed end 9 of the amphidizer 10. The amphidizer is specifically shown and described in a prior application filed by me on August 31st, 1909, Ser. No. 515,538, entitled Apparatus and method for amphidizing, and comprises a rotary drum with a central heating flue through which heat may be supplied, if necessary, by a suitable burner 12. The rotation of the drum operates to conduct the ore and air through the drum in one direction and return it in another to the same end, so that the ore is oxidized and more or less completely sulfated. In connection with the heating of the substance in the amphidizer 10 it should be noted that many ores contain sufficient sulfur to maintain the body at the necessary temperature by its combustion, so that the supply of heat by the burner 12 may often be necessary only in starting operations, after which the generation of heat by the oxidation of sulfur will maintain the temperature. Furthermore in some ores the percentage of sulfur is higher than that needed for operating the method, and I find that by regulating the blower 6 the quantity of air supplied to oxidize the sulfur may be so adjusted as to limit the oxidation to the desired amount, thereby controlling the temperature in the amphidizer.

As I have pointed out in my co-pending application, Ser. No. 515,538, the heat in the amphidizer is maintained at a point intermediate the dissociation points of ferric sulfate and copper sulfate. If there is a deficiency of sulfur in the ore for maintaining the heat, I find that carbon may be added for that purpose (in practice, ground up and mixed with the ore) without reducing the water soluble product of the amphidizer, or, consequently, the extraction of values in the solution drum.

It is also to be noted that with some ores the solutions employed in my process seem to more readily take up the values from sulfid remnants than from oxid remnants which again illustrates the necessity of maintaining a fixed temperature in the amphidizer to prevent the production of such oxid remnants.

The treatment in the amphidizer 10 develops considerable dust and fumes, as already described, and these may be led off through a suitable pipe 13 for absorption in the dust and fumes absorbing drum 14, the travel of the dust and fumes through the pipe 13 and drum 14 being facilitated by the suction pump 15. The absorption of the dust and fumes will be described later in more detail.

From the amphidizer 10 the amphidized substance passes through the chute 16 into the neck 17 of the reaction drum 18 which is rotatable and suitably supplied, as will herein appear, with solutions which dissolve out the values. The particular construction of this drum may be assumed to be such that the ore is agitated with the solutions and the mixture of solutions and solids discharged through conduit 19, upon the filter bed or beds 20. The filters may be assumed to be vacuum filters discharging through pipes 21 and 22, the latter forming a column sufficiently high to resist the vacuum which may be applied by pipe 23, the pressure pipe 24 being closed. These pipes are respectively connected to suitable sources of vacuum and pressure, not shown. The filtered solution passes from the pipe 22 into the well 25 and overflows through outlet 26. The depth of the well 25 is such that pressure applied through pipe 24, vacuum pipe 23 being closed, may operate through pipe 21 and filter block 20 to blow off the cake when the filter is inverted. From the outlet 26 the solutions pass into the oxidizer 27 wherein the salts of variable valency are subjected to further treatment (as by supplying air thereto) to insure that they will be at their highest desired valencies, and the solutions are then divided, one portion going through bypass 28, 29, to the dust and fumes absorbing drum 14, above referred to, under the influence of air lift 30. The solution which passes through the bypass, contains values and salts combined at their highest desired valencies, and their effect is thus to oxidize and react with the dust and fumes as indicated by the following reactions:

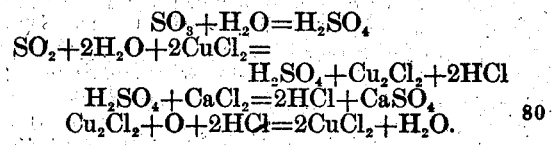

$$SO_3 + H_2O = H_2SO_4$$
$$SO_2 + 2H_2O + 2CuCl_2 =$$
$$H_2SO_4 + Cu_2Cl_2 + 2HCl$$
$$H_2SO_4 + CaCl_2 = 2HCl + CaSO_4$$
$$Cu_2Cl_2 + O + 2HCl = 2CuCl_2 + H_2O.$$

Similar reactions take place by the iron salts present.

Referring to the division of the solutions which was not directed through the bypass, it will be seen that they pass through pipe 31 into a heater 32 where their temperature is raised to facilitate precipitation. From the heater 32 they pass through pipe 33 into a precipitator 34 supplied through hopper 35 with a suitable precipitating agent such as calcium carbonate or cupric oxid, whereby the iron and aluminum salts are precipitated from the solutions. The precipitate is separated from the remaining solutions by a filter 36 operated as above described in connection with the first filters, and the solution, now containing among other substances copper and zinc salts, is led through pipe 37 and heater 37* to a precipitator 38 which is supplied through hopper 39 with calcium carbonate whereby copper is precipitated as cupric hydrate. The copper hydrate precipitate may be separated from the remaining solution by filter 40 operated as above described and removed for further treatment to obtain the metal, while the solution, which may still contain zinc values, is led through pipe 41 and either returned to the reaction drum 18 by pipe 42 or it may be partially or entirely diverted, when desired, through a bypass 43 and precipitator 44 supplied through hopper 45 with a suitable precipitating agent such as calcium oxid, whereby zinc is precipitated. The zinc precipitated may be separated from the depleted solution by filter 46 operated as above described and the solution returned through pipe 47 to the reaction drum 18.

The use of calcium carbonate for precipitating iron, aluminum and copper compounds regenerates, as already indicated, calcium chlorid, which is a solvent substance from which chlorid is supplied to the values. It will thus be seen that the primary solvent or carrier solution is regenerated and delivered to the reaction drum for taking up further values. The solutions containing the absorbed substances from the dust and fumes pass from the drum 14 through a duct indicated at 48, thence through a heating and agitating tank 49 which may have supplied thereto through pipe 50 an agitating gas or other substance such as air or steam, which may also have an oxidizing effect if desired. From the heating and agitating tank 49 the solutions are then delivered through pipe 51 into the reaction drum 18. The absorption of the dust and fumes in the manner described thus not only prevents contamination of the atmosphere by the fumes, but at the same time makes use of them. In operation the system described makes it possible to recover the values from sulfur bearing ores without any fumes being discharged into the atmosphere.

The reactions in the reaction drum and during the precipitation of iron, aluminum and copper, take place more rapidly if the solutions are heated to about 100° C. The solution may be heated in the reaction drum or on its way thereto—as indicated diagrammatically by the heating coils 2. The addition of oxygen to the solutions, and the employment of vacuum filtration both cause reductions of temperatures. The purpose and importance of heating the solutions at the points 32, 37ª and 49 will thus be apparent.

In the operation of my process, the carrier solution is regenerated and used over and over again in cyclic manner so that there is practically no loss of solutions. Such being the case, the necessity for economizing in the quantity of solutions maintained is done away with and therefore I prefer to maintain the solutions in considerable excess. In this way the necessity for close observation by the attendant is eliminated, as when the calcium chlorid is in excess the operation can be carried on for a considerable period of time without depleting the solutions of calcium chlorid even though the precipitator may not be in operation. In other words, an excess of calcium chlorid gives an elasticity to the system thus reducing the labor and in many cases the analysis that would otherwise be necessary to maintain a nice balance between the various chemical compounds involved.

In the specific instance of the carrying out of my invention described herein, the acid radical which intervenes in the solution to promote the shifting of the chlorin of the calcium chlorid from the calcium to the values in the ore, is developed mainly in the amphidizer in the form of $SO_2$, but it is not intended to limit the invention to this method, as the invention is capable in this and other respects of variations in many ways within the limits of the appended claims.

It will be noted that in this system the solution of calcium chlorid acts both as a solvent and as a carrier, circulating through the apparatus from the beginning to the end and when regenerated is restored to the beginning of the system without change of state; that the chloridizing of practically the entire values takes place in the solution drum and not in any preliminary roasting process; that there is no tendency to overload the system with chlorin salts requiring expensive processes of elimination, and that the solution is kept automatically restored to proper condition with the calcium chlorid in excess of that normally required for taking up the values without additions, except those required to make up for the slight waste that may occur.

What I claim is:

1. The method of concentrating copper values, which consists in associating in a calcium chlorid solution the ore containing commingled values and gangue and an acid radical developed from the materials used in the operation, shifting the chlorin from the calcium chlorid to the values by the intervention of the acid radical, so as to replace approximately all of the acid radical in the ore by chlorin, precipitating the waste products, separating the solution from the gangue and waste products and separating the values from the solution.

2. The method of concentrating copper values, which comprises treating the copper ore, containing the commingled values and gangue, with a calcium chlorid carrier which will dissolve the values and precipitate the waste products, separating the solution from the gangue and waste products, precipitating the values by a reagent which regenerates the carrier in condition for re-use of substantially all of said carrier in the operation, and separating the precipitated values from the solution.

3. The method of concentrating copper values, which comprises converting substantially all the copper content of a solution into copper chlorid, carrying the copper chlorid in a calcium chlorid solution, separating the solution from the gangue, and separating the values from the solution.

4. The method of concentrating copper values, which comprises dissolving the values from a commingled mass of values and gangue by a calcium chlorid solution, separating the solution from the gangue, and reacting upon the copper chlorid with calcium carbonate to separate the values from the solution and regenerate the calcium chlorid.

5. The method of concentrating copper values, which comprises converting the copper content into copper chlorid, dissolving the copper chlorid in a calcium chlorid solution, separating the solution from the gangue, reacting upon the copper chlorid with calcium carbonate whereby copper oxid is precipitated and calcium chlorid regenerated, and separating the precipitate from the solution.

6. The method of concentrating copper values, consisting in producing *in situ* an acid radical which is interchangeable in calcium chlorid solutions, taking up substantially all the values thereby, treating said values in a calcium chlorid solution, separating the gangue and recovering the values.

7. The method of concentrating copper values which comprises treating in a cyclic manner the substance bearing the values with a carrier solution containing dissolved solvent for the values maintained in considerable excess of that normally required for taking up the values.

8. The method of concentrating copper values which comprises treating the substance bearing the values with a carrier solution containing dissolved solvent maintained in considerable excess of that normally required for taking up the values, removing values from the solution and returning the solution for the taking up of further values.

9. The method of concentrating values which comprises treating the substance bearing the values with a carrier solution containing dissolved solvent maintained in considerable excess of that normally required for taking up the values, separating solutions from solids and precipitating the values from the solutions by a substance which regenerates the carrier solution.

10. The method of concentrating copper values, which comprises treating a copper bearing substance with a carrier solution containing calcium chlorid maintained in excess of that normally required for taking up the values.

11. The method of concentrating copper values, which comprises treating a copper bearing substance with a carrier solution containing calcium chlorid maintained in excess of that normally required for taking up the values, separating solutions from solids and precipitating the copper values from the solutions by calcium carbonate, whereby calcium chlorid is regenerated.

12. The method of concentrating copper values, which comprises amphidizing the ore, treating the commingled values and gangue from the amphidizer with calcium chlorid solution to dissolve the copper from the sulfate and produce cupric chlorid, dissolving in such copper chlorid any copper bearing remnants insoluble in calcium chlorid and removing the copper from the solution.

13. The continuous method of concentrating copper values, which comprises treating the copper bearing substance with a carrier which will dissolve the values and precipitate the waste products, filtering the solution from the gangue and waste products, precipitating the values with a reagent which regenerates the carrier, separating the precipitated values from the solution and returning the solution in a cyclic manner substantially without change of state.

14. The continuous method of concentrating copper values, which comprises treating the copper bearing substance with a carrier which will dissolve the values and precipitate the waste products, filtering the solution from the gangue, and waste products, precipitating the values by a reagent which regenerates the carrier, separating the precipitated values from the solution and returning substantially the whole solution in a cyclic manner.

15. The method of concentrating copper values, which comprises dissolving the values in a calcium chlorid solution, filtering the solution from the gangue, separating the values from the solution, and returning substantially the whole solution in a cyclic manner.

16. The method of concentrating copper values, which comprises converting the copper content into copper chlorid, dissolving the copper chlorid in a calcium chlorid solution, filtering the solution from the gangue, separating the values from the solution, and returning substantially the whole solution in a cyclic manner.

17. The method of concentrating copper values, which comprises dissolving the values in a calcium chlorid solution, filtering the solution from the gangue, separating the values from the solution, regenerating the calcium chlorid, and returning substantially the whole solution in a cyclic manner.

18. The method of concentrating copper values, which comprises converting the copper content into copper chlorid, dissolving the copper chlorid in a calcium chlorid solution, filtering the solution from the gangue, reacting upon the copper chlorid with calcium carbonate whereby copper oxid is precipitated and calcium chlorid regenerated, separating the precipitate from the solution, and returning the solution in a cyclic manner.

19. The method of concentrating copper values, which comprises treating the copper bearing substance with a carrier which will dissolve the values and precipitate the waste products, filtering the solution from the gangue, and waste products, precipitating the values from the solution, filtering the values from the solution, and returning substantially the whole solution in a cyclic manner.

20. The method of concentrating copper values, which comprises treating the copper bearing substance with a carrier which will dissolve the values and precipitate the waste products, filtering the solution from the gangue and waste products, precipitating the values by a reagent which regenerates the carrier, filtering the precipitated values from the solution, and returning substantially the whole solution in a cyclic manner.

21. The method of concentrating copper values, which comprises dissolving the values in a calcium chlorid solution, filtering the solution from the gangue, precipitating the values from the solution, filtering the values from the solution, and returning substantially the whole solution in a cyclic manner.

22. The method of concentrating copper values, which comprises converting the copper content into copper chlorid, carrying the copper chlorid in a calcium chlorid solution, filtering the solution from the gangue, precipitating the values from the solution, filtering the values from the solution, and returning substantially the whole solution in a cyclic manner.

23. The method of concentrating copper values, which comprises dissolving the values in a calcium chlorid solution, filtering the solution from the gangue, precipitating the values from the solution, filtering the values from the solution, regenerating the calcium chlorid, and returning substantially the whole solution in a cyclic manner.

24. The method of concentrating copper values, which comprises converting the copper content into copper chlorid, carrying the copper chlorid in a calcium chlorid solution, filtering the solution from the gangue, reacting upon the copper chlorid with calcium carbonate whereby copper oxid is precipitated and calcium chlorid regenerated, filtering the precipitate from the solution, and returning substantially the whole solution in a cyclic manner.

25. The continuous method of concentrating values, which comprises continuously circulating a solvent and carrier solution in cyclic manner through the steps of dissolving values, with formation of insoluble waste products, eliminating said waste products from solutions, separating values from solutions, and regenerating solvent material.

26. The continuous method of concentrating values, which comprises continuously circulating a solvent and carrier solution in cyclic manner through the steps of dissolving values with formation of insoluble waste products, filtering solutions from said waste products, precipitating values from solutions and regenerating solvent material, and filtering precipitated values from solutions.

27. The continuous method of concentrating values, which comprises continuously amphidizing the copper bearing substance, and continuously circulating a solvent and carrier solution in cyclic manner through the steps of dissolving values from the amphidized substance, eliminating gangue from solutions, separating values from solutions, and regenerating solvent material.

28. The continuous method of concentrating values, which comprises continuously amphidizing the copper bearing substance, and continuously circulating a solvent and carrier solution in cyclic manner through the steps of dissolving values from the amphidized substance, filtering solutions from gangue, precipitating values from solutions and regenerating solvent material, and filtering precipitated values from solutions.

29. The method of concentrating copper values which comprises causing the circulation of a carrier solution containing chlorid in excess of that normally required for taking up the values in the ore to be treated, the ore being first treated with said solution to dissolve the values and precipitate the waste products, the solution then separated from the gangue and waste products carrying with it the values, the values then separated from the solution and the solution restored to its normal condition with the chlorin carrier in excess, and returned for the treatment of further copper bearing substances.

30. The method of concentrating copper values, which comprises continuously treating the copper bearing substance with a carrier solution containing dissolved solvent for the values in considerable excess of that normally required for taking up the values which will dissolve the values and precipitate the waste products, separating the solution from the gangue and waste products, and separating the values from the solution.

31. The method of concentrating copper values, which comprises continuously converting the copper content into copper chlorid, continuously carrying the copper chlorid in a calcium chlorid solution, separating the solution from the gangue, separating the values from the solution and returning substantially the whole solution in a cyclic manner.

32. The method of concentrating copper values, which comprises continuously amphidizing the copper bearing substance, to produce in combination with substantially all the values an acid radical which is interchangeable in calcium chlorid solutions, continuously carrying the values in calcium chlorid solution, separating the solution from the gangue, and separating the values from the solution.

33. The cyclic process of concentrating metallic values from ores which consists in amphidizing such values to produce in combination with substantially all the values an acid radical which is interchangeable in calcium chlorid solutions, continuously adding the resultant mass to a solution of calcium chlorid, continuously agitating said solution and mass, separating the gangue from the solution and precipitating the values from the solution.

34. The cyclic process of concentrating metallic values from ores, which consists in amphidizing such values to produce in combination with substantially all the values an acid radical which is interchangeable in calcium chlorid solutions, continuously adding the resultant mass to a solution of calcium chlorid, continuously agitating said solution and mass, separating the gangue from the solution, precipitating the values from the solution, and returning the solution for continuous addition of prepared ore.

35. The continuous method of concentrating values, which comprises continuously circulating a solvent and carrier solution containing an acid exchanging salt and a salt of an element of variable valency in cyclic manner through the steps of dissolving values with formation of insoluble waste products, eliminating said waste products from solutions, separating values from solutions and regenerating solvent material.

36. The continuous method of concentrating values, which comprises continuously circulating a solvent and carrier solution containing an acid exchanging salt and a salt of an element of variable valency in cyclic manner through the steps of dissolving values with formation of insoluble waste products, filtering solutions from said waste products, precipitating values from solutions and regenerating solvent material, and filtering precipitated values from said solutions.

37. The method of concentrating copper values, which comprises treating the copper bearing substance with a carrier solution containing an acid exchanging salt and a salt of an element of variable valency, precipitating the copper with a substance to restore the acid exchanging salt while retaining a portion of a salt of an element of variable valency, and returning the carrier solution to the further treatment of copper values.

38. The continuous method of concentrating values, which comprises continuously circulating a solvent and carrier solution containing acid exchanging salts and a salt of an element of variable valency in cyclic manner through the steps of dissolving values with formation of insoluble waste products, eliminating said waste products from solutions, separating values from solutions and regenerating solvent material.

39. The continuous method of concentrating values, which comprises continuously circulating a solvent and carrier solution containing acid exchanging salts and a salt of an element of variable valency in cyclic manner through the steps of dissolving values with formation of insoluble waste products, filtering solutions from said waste products, precipitating values from solutions and regenerating solvent material, and filtering precipitated values from said solutions.

40. The method of concentrating copper values, which comprises treating the copper bearing substance with a carrier solution containing an acid exchanging salt and salts of elements of variable valency, precipitating the copper with a substance to restore the acid exchanging salt while retaining a portion of the salts of elements of variable valency, and returning the carrier solution to the further treatment of copper values.

41. The method of concentrating copper values, which comprises treating the copper bearing substance with a carrier solution containing an acid exchanging salt and salts of elements of variable valency, precipitating the copper with a substance to restore the acid exchanging salt while retaining a portion of a salt of an element of variable valency, and returning the carrier solution to the further treatment of copper values.

42. The method of concentrating values, which comprises taking into solution salts of variable valency, continuously maintaining the salts at their highest valency, and precipitating values from the solutions containing the salts at their highest valency.

43. The method of concentrating values from salts of elements of variable valency, which consists in taking the values into solution, dividing the solution, precipitating the values from one division while maintaining the salts at highest valency and returning both divisions to the cycle of operations.

44. The method of concentrating values, which comprises taking into solution salts of variable valency, maintaining the salts at their highest valency, dividing the solutions, precipitating values from one division while its salts are at highest valency, and returning the other division still containing the salts at their highest valency to the dissolving of further values.

45. The method of concentrating values, which comprises taking into solution salts of variable valency, maintaining the salts at their highest valency, precipitating values from the solution while the salts are at highest valency and regenerating solvent material, and returning the regenerated solvent to the dissolving of further values.

46. The method of concentrating values, which comprises taking into solution salts of variable valency, maintaining the salts at their highest valency, dividing the solution, precipitating values from one solution while the salts are at highest valency and regenerating solvent material, and returning both divisions to the dissolving of further values.

47. The method of concentrating values, comprising amphidizing the substance containing the values, collecting the dust and fumes therefrom, taking into solution as salts of variable valency the values from the amphidized substance, maintaining the salts at their highest valency, dividing the solution, absorbing the dust and fumes in one division while the salts are at highest valency, and precipitating values from the other division while the salts are at highest valency.

48. The method of concentrating values, which comprises amphidizing the substance containing the values, collecting the dust and fumes therefrom, taking into solution as salts of variable valency the values from the amphidized substance, maintaining the salts at their highest valency, dividing the solution, absorbing the dust and fumes in one division while the salts are at highest valency, precipitating values and regenerating solvent material in the other division while the salts are at highest valency, and returning the division with absorbed dust and fumes and the division with regenerated solvent material to the dissolving of further values.

49. The method of treating copper bearing substances, which comprises oxidizing the active portions of the substance, collecting the volatile products of oxidation in a carrier comprising a salt capable of exchanging acids in combination with salts of variable valency, subjecting the substance to such carrier whereby the values are taken into solution, separating the solution from the gangue, and precipitating the values by a substance which restores said acid exchanging salt.

50. The method of treating copper bearing substances, which comprises oxidizing the active portions of the substance, collecting the volatile products of oxidation in a calcium chlorid carrying and transforming solution, subjecting the substances to such carrier whereby the values are taken into solution, separating the solution from the gangue, and precipitating the values by a substance which restores calcium chlorid to the solution.

51. The method of concentrating values, which comprises amphidizing the substance bearing the values, collecting the dust and fumes therefrom, dissolving values from the amphidized substance in a primary solvent, dissolving in the dissolved values portions of values insoluble in the primary solvent, and absorbing the dust and fumes in solutions thus formed.

52. The method of concentrating values, which comprises amphidizing the substance bearing the values, collecting the dust and fumes therefrom, dissolving values from the amphidized substance in a primary solvent whereby such values are converted into a secondary solvent, dissolving in the secondary solvent values insoluble in the primary solvent, and absorbing the dust and fumes in solutions thus formed.

53. The method of concentrating values, which comprises amphidizing the substance bearing the values, collecting the dust and fumes therefrom, dissolving values from the amphidized substance in a primary solvent, dissolving in the dissolved values portions of values insoluble in the primary solvent, separating solutions from the gangue, dividing the solutions, absorbing the dust and fumes in one division, precipitating and separating values from the other division and regenerating the primary solvent therein, and returning the two divisions through the cycle of operations.

54. The method of concentrating values, which comprises amphidizing the substance bearing the values, collecting the dust and fumes therefrom, dissolving values from the amphidized substance in a primary solvent whereby such values are converted into a secondary solvent, dissolving in the secondary solvent values insoluble in the primary solvent, separating solutions from the gangue, dividing the solutions, absorbing the dust and fumes in one division, precipitating and separating values from the other division and regenerating the primary solvent therein, and returning the two divisions through the cycle of operations.

55. The method of concentrating values, which comprises amphidizing the substance bearing the values, collecting the dust and fumes therefrom, dissolving values from the amphidized substance in a primary solvent, dissolving in the dissolved values portions of values insoluble in the primary solvent, separating solutions from the gangue, dividing the solutions, absorbing the dust and fumes in one division, treating the other division with a substance which precipitates values and regenerates the primary solvent, separating the precipitate, and returning the two divisions of solution through the cycle of operations.

56. The method of concentrating values, which comprises amphidizing the substance bearing the values, collecting the dust and fumes therefrom, dissolving values from the amphidized substance in a primary solvent whereby such values are converted into a secondary solvent, dissolving in the secondary solvent values insoluble in the primary solvent, separating solutions from the gangue, dividing the solutions, absorbing the dust and fumes in one division, treating the other division with a substance which precipitates values and regenerates the primary solvent therein, separating the precipitate, and returning the two divisions of solution through the cycle of operations.

57. The method of concentrating values of copper bearing substances, which comprises the treatment of such substances in an amphidizer and bringing the dust and fumes therefrom in contact with a calcium chlorid solution.

58. The method of concentrating values which comprises amphidizing the ore, taking the values into solution, collecting the dust from amphidizing in the solutions and transferring the solutions with the dust to the dissolving of further values.

59. The method of concentrating values which comprises amphidizing the ore, taking the values into solution, collecting the dust and fumes from the amphidizing in the solutions and transferring the solutions containing the dust and fumes to the dissolving of further values.

60. The method of concentrating values, which comprises amphidizing the ore, taking the values into solution, collecting the dust from amphidizing in the solutions, adding oxygen to the solutions, and transferring the solutions containing dust and oxygen to the dissolving of further values.

61. The method of concentrating values which comprises amphidizing the ore, taking the values into solution, collecting the dust and fumes from amphidizing in the solutions, adding oxygen to the solutions, and transferring the solutions containing dust, fumes and oxygen to the dissolving of further values.

62. The method of concentrating values, which comprises amphidizing the ore, taking the values into solution as "ic" chlorids, collecting the volatile products from amphidizing in the solutions, adding oxygen to the solutions, and transferring the solutions to the dissolving of further values.

63. The method of concentrating values, which comprises amphidizing the ore, taking the values into solution as "ic" chlorids and dissolving them in calcium chlorid solution, collecting the volatile products from amphidizing in the solutions, adding oxygen to the solutions, and transferring the solutions to the dissolving of further values.

64. The method of concentrating values, which comprises amphidizing the ore, taking the values into solution, collecting the volatile amphidizer products in the dissolved values, adding oxygen to the solutions, heating the solutions, and transferring the heated solutions to the dissolving of further values.

65. The method of concentrating values, comprising oxidizing the substance bearing such values, dissolving the volatile products of the oxidation at low temperature, heating the solution and using it to dissolve the oxidized substance at higher temperature.

66. The method of concentrating values, comprising oxidizing the substance containing values, dissolving the values, filtering and washing the solution from the gangue, bringing the volatile products of oxidation into contact with the solution and partially evaporating the added washing water.

67. The method of concentrating the values in copper bearing substances, comprising amphidizing such substances, treating the non-volatile part of such substances in a calcium chlorid solution, treating the volatile part thereof in a separate body of solution, commingling the two solutions, producing and dissolving copper chlorid, separating the solution from the gangue and separating the values from the solution.

68. The method of concentrating the values in copper bearing substances, comprising amphidizing such substances, treating the non-volatile part of such substances in a calcium chlorid solution, treating the volatile part thereof in a separate body of solution, oxidizing the solution, commingling the two solutions, producing and dissolving copper chlorid, separating the solution from the gangue and separating the values from the solution.

69. The method of concentrating the values in copper bearing substances, comprising amphidizing such substances, treating the non-volatile part of such substances in a calcium chlorid solution, treating the volatile part thereof in a separate body of solution, heating the solution, commingling the two solutions, producing and dissolving copper chlorid, separating the solution from the gangue and separating the values from the solution.

70. The cyclic method of concentrating values, which consists in taking the values into solution, dividing the solution, precipitating the values from one division of the solution and returning both divisions of solution to the cycle of operations.

71. The cyclic method of concentrating values, which consists in taking the values into solution, eliminating the gangue from the solution, dividing the solution, precipitating and removing the values from one division of the solution, and returning both divisions of the solution to the cycle of operations.

72. The cyclic method of concentrating values, which comprises dissolving values in a primary solvent, dissolving in the dissolved values portions of values insoluble in the primary solvent, separating solutions from the gangue, dividing the solutions, precipitating and separating values from one division and regenerating therein the primary solvent, and returning the two divisions through the cycle of operations.

73. The cyclic method of concentrating values, which comprises dissolving values in a primary solvent, whereby such values are converted into a secondary solvent, dissolving in such secondary solvent values insoluble in the primary solvent, separating solutions from the gangue, dividing the solutions, precipitating and separating values from one division and regenerating therein the primary solvent and returning the two divisions through the cycle of operations.

74. The cyclic method of concentrating values, which comprises dissolving values in a primary solvent, dissolving in the dissolved values portions of values insoluble in the primary solvent, separating solutions from the gangue, dividing the solutions, treating one division with a substance which precipitates values and regenerates the primary solvent, separating the precipitate, and returning the two divisions through the cycle of operations.

75. The cyclic method of concentrating values, which comprises dissolving values in a primary solvent whereby such values are converted into a secondary solvent, dissolving in the secondary solvent values insoluble in the primary solvent, separating solutions from the gangue, dividing the solutions, treating one division with a substance which precipitates values and regenerates the primary solvent, separating the precipitate, and returning the two divisions through the cycle of operations.

76. The method of concentrating copper values, which comprises dissolving the values in a calcium chlorid solution containing calcium chlorid in excess of that normally required for taking up the values filtering the solution from the waste products and recovering the values.

77. The method of concentrating copper values, which comprises dissolving the values in a calcium chlorid solution containing calcium chlorid in excess of that normally required for taking up the values, separating the solution from the waste products, precipitating the values and filtering the values from the solution.

78. The method of concentrating copper values, which comprises dissolving the values in a calcium chlorid solution containing calcium chlorid in excess of that normally required for taking up the values, filtering the solution from the gangue, and precipitating and filtering the values from the solution.

79. The method of concentrating copper values, which comprises converting the copper content into copper chlorid, carrying the copper chlorid in a calcium chlorid solution containing calcium chlorid in excess of that required for taking up the values, filtering the solution from the gangue, and precipitating and filtering the values from the solution.

80. The method of concentrating copper values, which comprises dissolving the values in a calcium chlorid solution containing calcium chlorid in excess of that normally required for taking up the values, filtering the solution from the gangue, precipitating the values from the solution by an agent which regenerates the calcium chlorid, and filtering the values from the solution.

81. The method of concentrating copper values, which comprises converting the copper content into copper chlorid, carrying the copper chlorid in a calcium chlorid solution containing calcium chlorid in excess of that required for taking up the values, filtering the solution from the gangue, reacting upon the copper chlorid with calcium carbonate whereby copper oxid is precipitated and calcium chlorid regenerated, and filtering the precipitate from the solution.

82. The cyclic method of concentrating values, which comprises taking the values into solution, precipitating the values and regenerating solvent material in the solution, separating the precipitate from the solution by vacuum filtration, and heating and returning the regenerated solution to the dissolving of further values.

83. The method of concentrating values in substances containing copper in association with other metals, comprising taking the metals into solution by the employment of an acid exchanging salt, separating the gangue from the solution, precipitating the values from the solution by a reagent which regenerates the acid exchanging salt in condition for re-use in the operation without change of state, separating the values from the solution, and returning the solution to the cycle of operations.

84. The method of concentrating values from copper bearing substances, which comprises dissolving iron and copper compounds in a primary solvent whereby such compounds are converted into solvents for values insoluble in the primary solvent, separating solutions from the gangue, dividing the solutions, precipitating the values from one division while retaining the values in solution in the other division, and returning the solutions still containing the dissolved values to the treatment of the copper bearing substance.

85. The method of concentrating values from copper bearing substances, which comprises dissolving iron and copper compounds in a primary solvent whereby such compounds are converted into solvents for values insoluble in the primary solvent, separating solutions from solids, dividing the solutions, precipitating values from one division and regenerating therein the primary solvent, while retaining the values in solution in the other division, and returning the solutions still containing the dissolved values and the solutions containing the regenerated primary solvent to the treatment of the copper bearing substance.

86. The method of obtaining substances from their solutions, comprising treating a solution containing, iron, aluminum, copper and zinc compounds with calcium carbonate whereby iron, aluminum and copper values are precipitated and treating the remaining solution with calcium oxid whereby zinc values are precipitated.

87. The method of concentrating values, which comprises treating a copper bearing substance containing arsenic with calcium chlorid solution, whereby copper compounds are dissolved and the arsenic content rendered insoluble and precipitated, separating solids from solutions, and recovering the values from the solutions.

CHARLES S. BRADLEY.

Witnesses:
H. H. KNIGHT,
CLARA HOHENSTEIN.